US007610034B2

(12) United States Patent
Chang

(10) Patent No.: US 7,610,034 B2
(45) Date of Patent: Oct. 27, 2009

(54) METHOD AND APPARATUS FOR SELECTION OF DESIGN PARAMETERS FOR DOUBLE CONVERSION TUNER TO PREVENT RADIATED IMMUNITY DEGRADATION

(75) Inventor: Kevin T. Chang, Doylestown, PA (US)

(73) Assignee: General Instrument Corporation, Horsham, PA (US)

( * ) Notice: Subject to any disclaimer, the term of this patent is extended or adjusted under 35 U.S.C. 154(b) by 379 days.

(21) Appl. No.: 11/252,509

(22) Filed: Oct. 18, 2005

(65) Prior Publication Data

US 2007/0087714 A1 Apr. 19, 2007

(51) Int. Cl.
*H04B 1/16* (2006.01)

(52) U.S. Cl. ........................ 455/339; 455/208; 455/209

(58) Field of Classification Search .................. 455/339
See application file for complete search history.

(56) References Cited

U.S. PATENT DOCUMENTS

| | | | | |
|---|---|---|---|---|
| 5,701,600 | A * | 12/1997 | Wetters et al. | 455/208 |
| 6,057,876 | A | 5/2000 | Waight | 348/11 |
| 2003/0224748 | A1* | 12/2003 | Gomez et al. | 455/209 |

* cited by examiner

*Primary Examiner*—Yuwen Pan
*Assistant Examiner*—Ajibola Akinyemi
(74) *Attorney, Agent, or Firm*—Larry T. Cullen

(57) ABSTRACT

A double conversion tuner system is disclosed that avoids the problem of degraded performance as a result of radiated interferers. Several selection criteria are described for specifying the parameters of the tuner, including the nominal first or high intermediate frequency, a first local oscillator signal for each desired channel, a nominal second local oscillator signal, and a bandwidth of the first intermediate frequency.

20 Claims, 7 Drawing Sheets

TO DEMODULATOR
IF OUTPUT
28
26
BPF

VARIABLE GAIN AMPLIFIER
24
22
BPF
18
2ND LO
1st IF
16
1ST LO
20
VARIABLE GAIN AMPLIFIER
14
34
SYNTHESIZER
CONTROL BUS
32
RF INPUT
12
11
PROCESSOR

METHOD AND APPARATUS FOR SELECTION OF DESIGN PARAMETERS FOR DOUBLE CONVERSION TUNER TO PREVENT RADIATED IMMUNITY DEGRADATION

FIELD OF THE INVENTION

The invention relates to devices and methods for selection of local oscillator frequencies for use in double conversion tuners.

BACKGROUND OF THE INVENTION

It has been observed that devices such as set top boxes, cable modems, and embedded multimedia terminal adapters ("eMTA"s) can suffer from performance degradation when radiated interferers such as cordless telephones, cellular telephones and wireless routers are placed in proximity to them. The performance degradation can take the form of increased bit error rate, or in the extreme case, complete loss of the input signal. With a set top box, the performance degradation can result in degraded picture quality or complete loss of picture. With a cable modem, performance degradation will result in lost data. With an eMTA, increased bit error rate can result in poor voice quality or complete loss of calls.

When products with this susceptibility are deployed, users are advised to increase the distance between the susceptible device and the interfering device. This is referred to as the Safe Operating Area. As this is operationally an undesirable solution to the problem, design techniques are required to solve the problem at the point of the susceptibility, namely the RF tuner of the settop, cable modem or eMTA.

In more detail, the problem is manifested when the local oscillator ("LO") of a broadband tuner has harmonics that fall within the bandwidth of a radiating interferer. U.S. Pat. No. 6,057,876, for a "Dual conversion set-top terminal including a system for avoiding oscillator difference beats," discloses the manipulation of $1^{st}$ and $2^{nd}$ LO's and 1st intermediate frequency ("IF") bandwidth to improve performance of a tuner relative to oscillator difference beats. However, amongst other things the disclosure does not address the problem of radiating interferers.

Another attempted solution for this problem is to use heavy mechanical shielding of the tuner subsystem to reduce the magnitude of the problem. However, even such mechanical efforts at reducing degradation are limited.

DETAILED DESCRIPTION

This specification describes several selection criteria that can be used to avoid the problem of degraded performance as a result of radiated interferers. These criteria include specifying a nominal 1st IF, a 1st LO for each desired channel, a nominal 2nd LO, and a bandwidth of the 1st IF.

Figure 1:
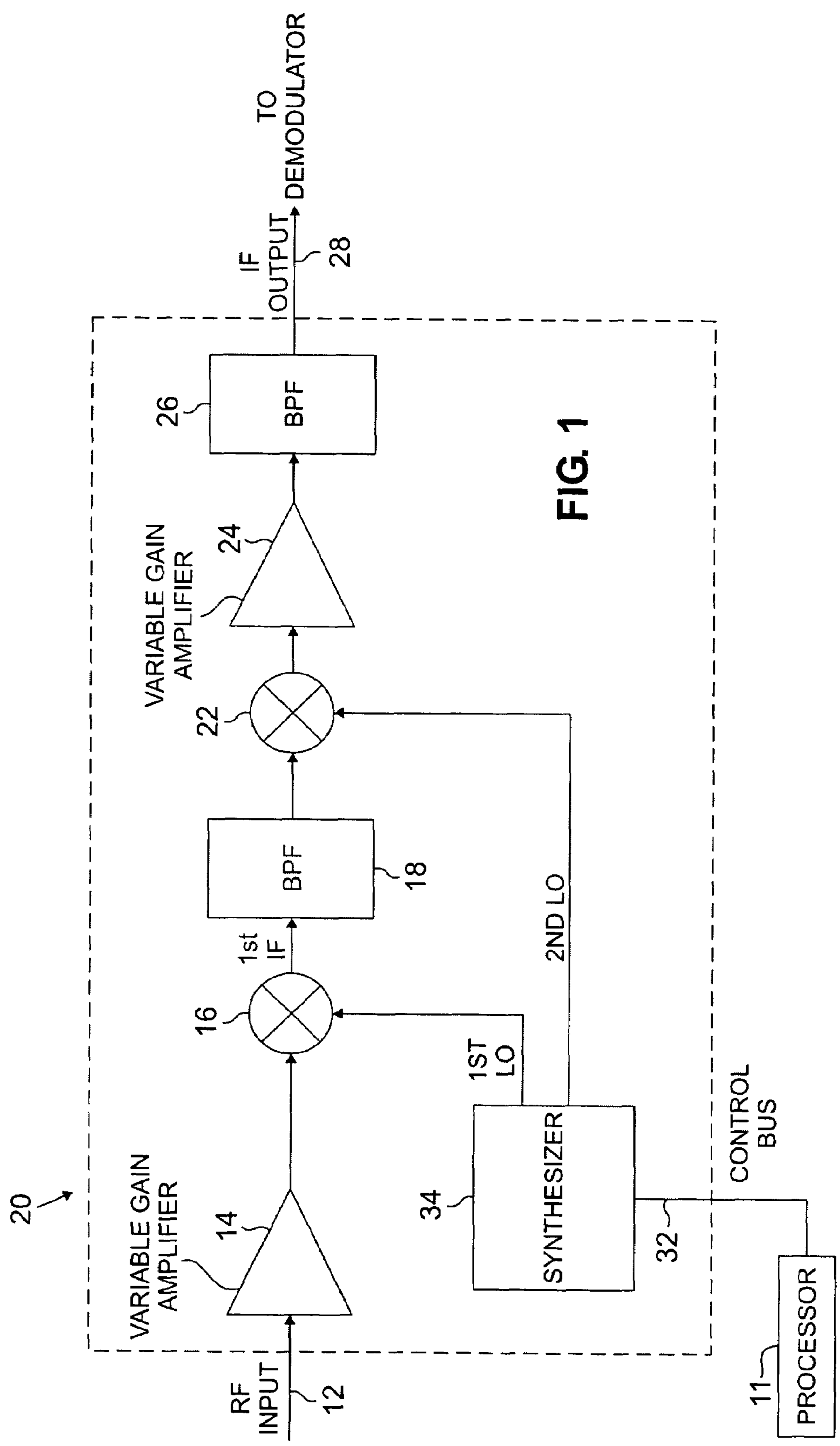
FIG. 1 shows a block diagram of an illustrative double conversion tuner.

FIG. 1 is a simplified block diagram of an illustrative double conversion tuner 20, suitable for use in cable modems. An RF input 12 is a collection of frequency-division-multiplexed channels, spaced by, e.g., 6 MHz. The RF input 12 represents a number of channels for viewing by a consumer, and may include modulated analog or digital signals.

The RF input 12 leads to a variable gain amplifier 14, whose output is mixed via mixer 16 with a $1^{st}$ LO output from a synthesizer 34 fed by a control bus 32. The output from mixer 16 is the first or high intermediate frequency, i.e., the $1^{st}$ IF. In practice, the $1^{st}$ IF is chosen prior to the set of $1^{st}$ LO's: the $1^{st}$ IF is chosen such that the $1^{st}$ LO's are appropriate and do not lead to interference with interferers. The variable gain amplifier 14 amplifies or attenuates the RF input based on the received signal level of the input. The synthesizer 34 is controlled by a processor 11 to generate $1^{st}$ LO and $2^{nd}$ LO signals.

The $1^{st}$ IF from mixer 16 is sent to a first bandpass filter 18 and from there the result is mixed with a $2^{nd}$ LO from synthesizer 34 using mixer 22. The result from mixer 22 is sent to another variable gain amplifier 24, a second bandpass filter 26, and the IF output 28 may be sent to, e.g., a demodulator for further processing. Those of skill in the art will appreciate that the variable gain amplifiers 14 and 24 may be driven or controlled from a variety of sources, such as the processor or a demodulator, or may be driven from their own internal control parameters.

At a more system level, the broadband modem processor 11 tunes to its desired channel by programming the synthesizer 34 to generate two separate LO signals—a $1^{st}$ LO and a $2^{nd}$ LO. The broadband input 12 and the $1^{st}$ LO are mixed, yielding the desired channel at the $1^{st}$ IF frequency. The $2^{nd}$ LO mixes the $1^{st}$ IF frequency down to the desired IF output, e.g., 43.75 or 44 MHz, which is labeled "Z" below. This IF output 28 is sent to a digital demodulator for further signal processing.

Systems disclosed here present a methodology for selection of key parameters for ensuring that the LO's and their harmonics do not fall within problematic frequencies.

Figure 7:
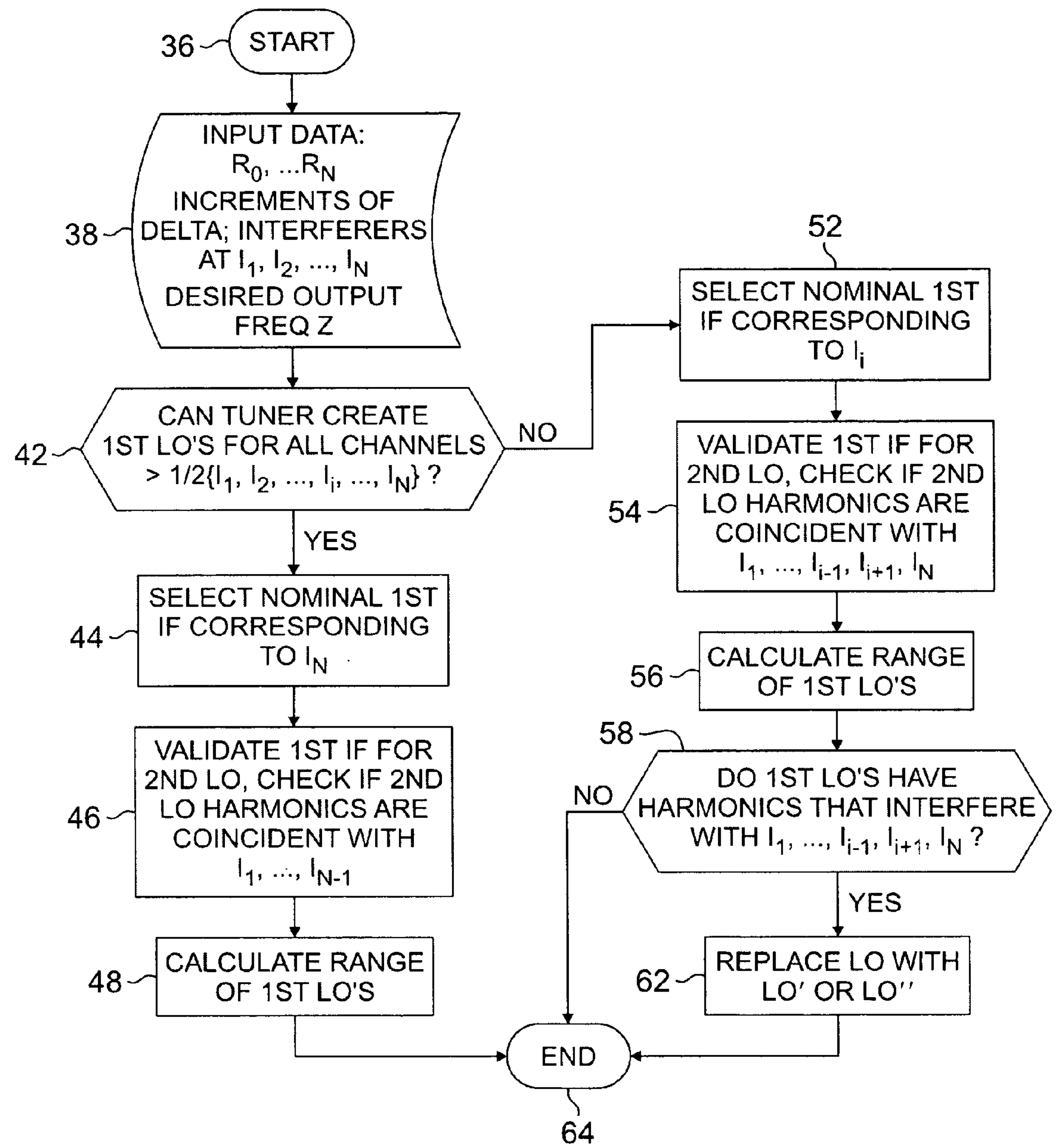
FIG. 7 shows a flowchart showing the method.

One type of methodology is shown in FIG. 7. The method starts (step 36) and a variety of input data (step 38) are present. The input data includes a set of channels from $R_0$ to $R_N$ in increments of delta, e.g., 93 MHz to 855 MHz in increments of 6 MHz. What is desired to be avoided are the interfering frequencies $I_1, \ldots, I_N$. The interference frequencies may be known and certain electronic components may be anticipated as potential sources of the interference frequencies. Such frequencies may be due to electromagnetic or RF interference being emitted from known electronic components. The interfering frequencies may be empirically determined or provided from an external source, such as a vendor of other products. The interfering frequencies may be preprogrammed into processor 11 or may provided to processor 11 via a keyboard or other electronic input such as a computer readable medium such as a magnetic or optical disk, a semiconductor based memory, or wireline or wireless communication link, such as an Internet link. The output of the method will be the $1^{st}$ IF bandwidth and a range of $1^{st}$ LO frequencies.

The first step is the selection of the nominal $1^{st}$ IF frequency. This is performed by checking the values of $I_i$ and selecting a value of the minimum $1^{st}$ LO that is at least one-half the frequency of $I_i$, so long as this value is within the range of the synthesizer of the tuner (step 42). Ideally, the $1^{st}$ IF frequency would be high enough so that the $2^{nd}$ harmonic of the lowest $1^{st}$ LO falls above the highest frequency of the interfering frequencies.

In other words, a set of potential $1^{st}$ LO signals based on the interference signals is developed and checked to see whether the same can be accommodated by the synthesizer of the tuner. If the tuner can create $1^{st}$ LO's for all desired channels that are greater than one-half the frequency of all interferers $I_1$ through $I_N$, then the "YES" path from step 42 is followed and steps 44-48 and 64 are performed, concluding the method.

In particular, if the tuner can create $1^{st}$ LO's for all desired channels that are greater than one-half the frequency of all interferers $I_1$ through $I_N$, then the selection of the $1^{st}$ IF (step 44) is based on the highest interfering frequency, $I_N$. In that case:

$$1^{st}IF>=I_N/2-R_0$$

At this point the selection of the $1^{st}$ IF corresponding to $I_N$ is validated for the $2^{nd}$ LO (step 46). The $2^{nd}$ LO=$1^{st}$ IF−Z, where Z is the desired output frequency. In other words, a check may be performed to see if the $2^{nd}$ LO has any harmonics that may interfere with $I_1$ through $I_{N-1}$. If it does, then the $1^{st}$ IF is adjusted upwards or downwards until the situation is corrected. If the $2^{nd}$ LO has no harmonics that may interfere with $I_1$ through $I_{N-1}$, then the range of $1^{st}$ LO's may be calculated (step 48):

$$1^{st}LO=\text{Desired Frequency}+1^{st}IF \quad \text{(Eq. 1)}$$

Thus:

$$1^{st}LO=R_0+1^{st}IF,\ R_1+1^{st}IF,\ \ldots,\ R_N+1^{st}IF \quad \text{(Eq. 2)}$$

And the process concludes (step 64).

If the tuner cannot create $1^{st}$ LO's for all desired channels that are greater than one-half the frequency of all interferers $I_1$ through $I_N$, then the "NO" path from step 42 is followed and steps 52-62 and 64 are performed. In particular, if the tuner cannot create $1^{st}$ LO's for all desired channels that are greater than one-half the frequency of all interferers $I_1$ through $I_N$, then the selection of the $1^{st}$ IF (step 52) is based on the highest interfering frequency, $I_i$ corresponding to which the tuner can synthesize an appropriate minimum $1^{st}$ LO. In that case:

$$1^{st}IF>=I_i/2-R_0 \quad \text{(Eq. 3)}$$

At this point the selection of the $1^{st}$ IF corresponding to $I_i$ is validated for the $2^{nd}$ LO (step 54). That is, a check may then be performed to see if the $2^{nd}$ LO has any harmonics that may interfere with $I_1$ through $I_{i-1}$ and $I_{i+1}$ through $I_N$. If it does, then as before the $1^{st}$ IF is adjusted upwards or downwards until the situation is corrected. If the $2^{nd}$ LO has no harmonics that may interfere with these remaining interferers, then the range of $1^{st}$ LO's is calculated (step 56) via Equation (1) above.

A check may be performed as to whether the $1^{st}$ LO's so calculated have harmonics that interfere with $I_1$ through $I_{i-1}$ and $I_{i+1}$ through $I_N$ (step 58). If not, then the $1^{st}$ LO's may be used as calculated and the process terminated (step 64). If some of the $1^{st}$ LO's so calculated have harmonics that interfere with $I_1$ through $I_{i-1}$ and $I_{i+1}$ through $I_N$, however, then each interfering $1^{st}$ LO may be replaced with either $1^{st}$ LO', which has a frequency below the $1^{st}$ LO, or $1^{st}$ LO", which has a frequency above the $1^{st}$ LO (step 62).

The selection of LO' or LO" may be based on which of the two is closer to the $1^{st}$ LO calculated above in Equation (2). Either choice is acceptable, but the $1^{st}$ IF passband is impacted based on the choice. As the $1^{st}$ LO for each channel $R_1$ through $R_N$ is checked above (step 58), a range of unacceptable channels may arise. LO' represents the $1^{st}$ LO for the last acceptable channel prior to a range of unacceptable $1^{st}$ LO's. LO" represents the $1^{st}$ LO for the first acceptable channel after the range of unacceptable $1^{st}$ LO's. By using $1^{st}$ LO' and $1^{st}$ LO" in this manner, the $1^{st}$ IF passband generally grows symmetrically about the nominal $1^{st}$ IF.

The use of LO' and LO" leads to a modification of the value of the $1^{st}$ IF for each of the modified LO's, and the use of the modified $1^{st}$ IF leads to a modification of the $2^{nd}$ LO. Finally, the system then employs a modified 1st bandpass filter to accommodate the additional $1^{st}$ IF's. In particular:

$$1st\ IF\ \text{passband bandwidth}=\text{interferer bandwidth/order of}\ LO\ \text{harmonic}+\text{desired channel}\ BW \quad \text{(Eq. 4)}$$

This method is now illustrated by the following example.

EXAMPLE

This example takes desired RF channels and two bands of interfering signals as inputs to the problem, and yields $1^{st}$ LO frequencies and the $1^{st}$ IF Bandwidth as the solution.

In this example, the desired channels range from 93 MHz to 855 MHz in 6 MHz increments. Two radiating interferers occupy the frequency range of 2.400 GHz to 2.485 GHz, and 5.725 GHz to 5.850 GHz, referred to as 2.4 GHz and 5.8 GHz interferers, respectively.

The first task is to select the nominal or high $1^{st}$ IF frequency. This is typically limited by the range of the tuner's LO synthesizer. Within the range of the tuner, however, there is some freedom in selecting an optimal IF frequency. Ideally, the $1^{st}$ IF frequency would be high enough so that the $2^{nd}$ harmonic of the lowest $1^{st}$ LO falls above the highest frequency of the interferers. In this example, with the highest frequency of the interferer at 5,850 MHz, the $1^{st}$ LO should be greater than 5,850 MHz/2, or 2,925 MHz. As this is not practical with certain double conversion tuners, the other interferer will be considered. To avoid the 2.485 GHz interferer, the $1^{st}$ LO should be greater than 2,485 MHz/2, or 1,242.5 MHz. This value is often practical for certain double conversion tuners.

The minimum value of the $1^{st}$ LO arises with the lowest desired channel. In this example, the lowest desired channel is 93 MHz. Using a $1^{st}$ LO of 1,243 MHz for this channel would place the $1^{st}$ IF at 1,243 MHz minus 93 MHz or 1150 MHz. This value of 1150 MHz is the nominal $1^{st}$ IF Frequency.

This value of IF frequency is then validated for the $2^{nd}$ LO. With a desired IF output of 43.75 MHz, the second LO would be 1150 MHz−43.75 MHz=1106.25 MHz. This $2^{nd}$ LO frequency does not have any harmonics in the 5.8 GHz or 2.4 GHz interfering bands.

Since the limitation of the tuner's synthesizer did not permit a selection of the $1^{st}$ IF that would solve the immunity degradation for the 5.8 GHz interferer, a second step is called for. With the selection of the $1^{st}$ IF at 1150 MHz in the first step, the $1^{st}$ LO will range from 1,243 MHz to 2,005 MHz, to tune channels from 93 MHz to 855 MHz, respectively. The $1^{st}$ LO frequency is determined by the sum of the desired frequency and the $1^{st}$ IF frequency as in Equation 1 above.

If the $1^{st}$ LO is set using Equation 1, there are two problematic areas that arise with respect to the 5.8 GHz interferer. Referring to Table 1, the $1^{st}$ LO for the desired frequencies of 753 MHz through 801 MHz is shown. Note that these channels represent the more challenging of the two problematic frequency ranges. The other range, 285-309 MHz, is not shown, but the solution for this range is similar to the range shown in Table 1.

TABLE 1

| (A) Desired (MHz) | (B) High $1^{st}$ LO (MHz) | (C) LO Harmonic in 2.4 GHz band | (D) LO Harmonic in 5.8 GHz band | (E) Modified 1st LO (MHz) | (F) Modified 1st IF (MHz) | (G) 2nd LO (MHz) | (H) 2nd IF (MHz) |
|---|---|---|---|---|---|---|---|
| 753 | 1903 | | | 1903 | 1150 | 1106.25 | 1193.75 |
| 759 | 1909 | | 3 | 1903 | 1144 | 1100.25 | 1187.75 |
| 765 | 1915 | | 3 | 1903 | 1138 | 1094.25 | 1181.75 |
| 771 | 1921 | | 3 | 1903 | 1132 | 1088.25 | 1175.75 |
| 777 | 1927 | | 3 | 1903 | 1126 | 1082.25 | 1169.75 |
| 783 | 1933 | | 3 | 1951 | 1168 | 1124.25 | 1211.75 |
| 789 | 1939 | | 3 | 1951 | 1162 | 1118.25 | 1205.75 |
| 795 | 1945 | | 3 | 1951 | 1156 | 1112.25 | 1199.75 |
| 801 | 1951 | | | 1951 | 1150 | 1106.25 | 1193.75 |

Figure 2:
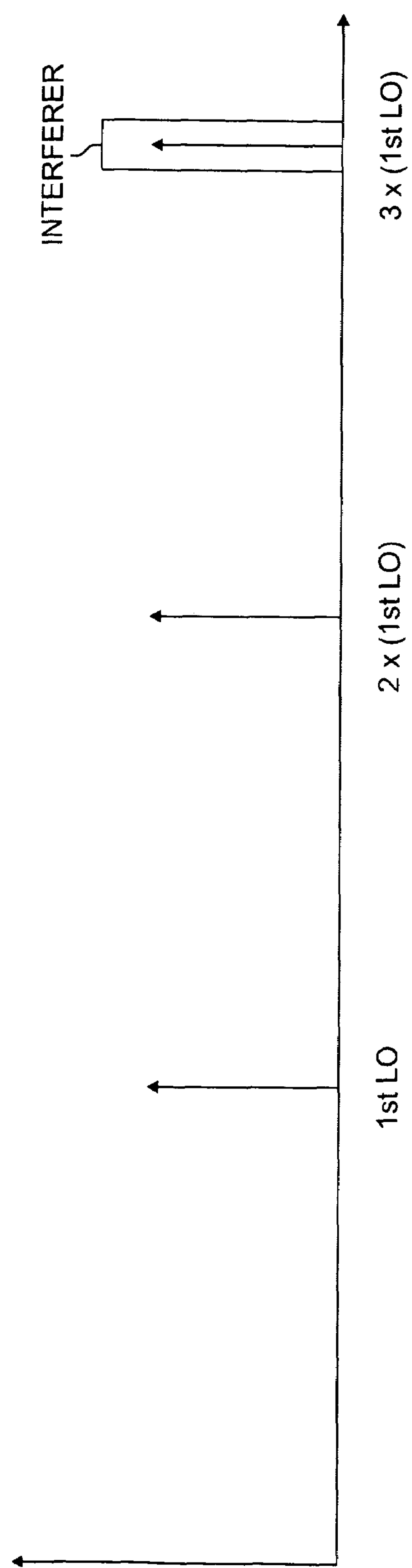
FIG. 2 shows a 3rd harmonic of a local oscillator within an interferer

Referring to Table 1, for 753 MHz, the 1st LO is 1903 MHz. For this 1st LO, there are no harmonics in the 2.4 GHz or 5.8 GHz band. However, for desired channels 59, 765, 771, 777, 783, 789, and 795 MHz, the 3rd harmonic of the 1st LO fall in the 5.8 GHz band, as shown in FIG. 2. In this figure, the radiating interferer is shown substantially centered on the $3^{rd}$ harmonic of the $1^{st}$ LO, shown as $3\times(1^{st}$ LO).

Figure 3:
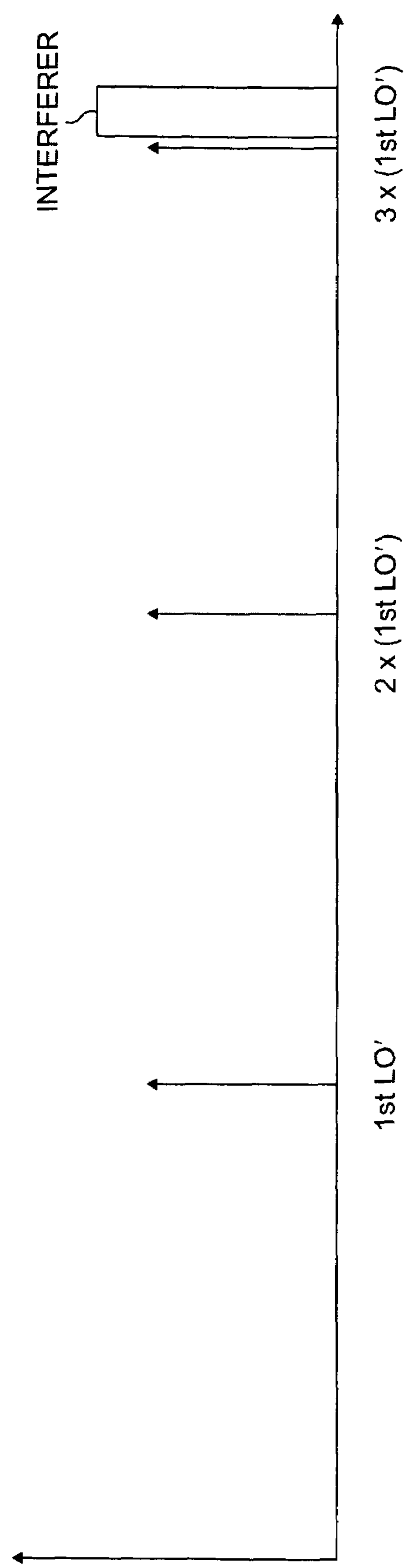
FIG. 3 shows a 3rd harmonic of a local oscillator, below the interferer bandwidth.

One solution to this problem is to select another 1st LO, either LO' which is lower in frequency than identified by Equation 1, or LO" which is higher in frequency than identified by Equation 1. The impact of the usage of the lower frequency LO' is shown in FIG. 3, and the impact of the higher frequency LO" is shown in FIG. 4.

For 759, 765, 771, and 777 MHz, the $1^{st}$ LO is modified to be below the value specified in Equation 1, resulting in the condition shown in FIG. 3. In this figure, the radiating interferer is shown just to the right of the $3^{rd}$ harmonic of the $1^{st}$ LO, shown as $3\times(1^{st}$ LO'). Thus, the $3^{rd}$ harmonic of the $1^{st}$ LO (now, the $3^{rd}$ harmonic of the $1^{st}$ LO') has been moved to avoid the interferer, and no interference results.

It should be noted that for these four channels, the $1^{st}$ LO is the same value, 1903 MHz, and it is also the same value as is used for 753 MHz, a non-problematic channel according to Equation 1.

Figure 4:
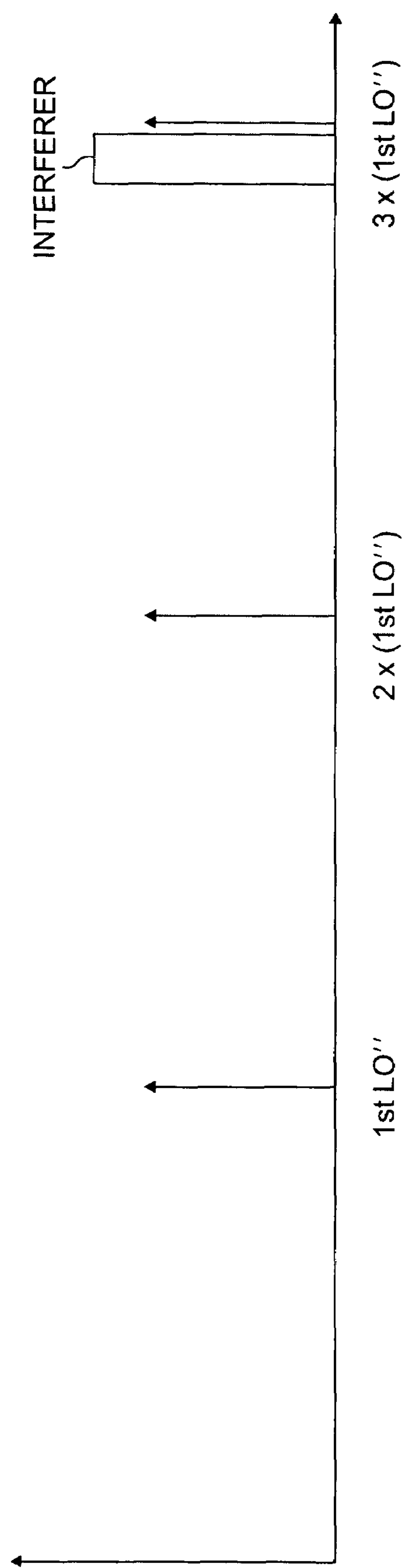
FIG. 4 shows a 3rd harmonic of a local oscillator, above the interferer bandwidth.

For 783, 789, and 795 MHz, the $1^{st}$ LO is modified to be above the value specified in Equation 1, resulting in the condition shown in FIG. 4. It should be noted that for these three channels, the $1^{st}$ LO is the same value, 1951 MHz, and it is also the same value as is used for 801 MHz, a non-problematic channel according to Equation 1. In FIG. 4, the radiating interferer is shown just to the left of the $3^{rd}$ harmonic of the $1^{st}$ LO, shown as $3\times(1^{st}$ LO). Thus, the $3^{rd}$ harmonic of the $1^{st}$ LO (now, the $3^{rd}$ harmonic of the $1^{st}$ LO") has been moved to avoid the interferer, and no interference results.

The use of LO' and LO" for these seven channels has several ramifications. First, since the $1^{st}$ LO is no longer defined by Equation 1, the $1^{st}$ IF will be different for each of these seven cases which are using LO'=1903 MHz or LO"=1951 MHz. Instead of the nominal $1^{st}$ IF of 1150 MHz, the $1^{st}$ IF will be 1144, 1138, 1132, 1126, 1168,1162 and 1156 MHz for tuning 759, 765, 771, 777, 783, 789, and 795 MHz, respectively.

Second, the $2^{nd}$ LO, instead of being the nominal 1106.25 MHz, will be 1100.25, 1094.25, 1088.25, 1082.25, 1124.25, 1118.25, and 1112.25 MHz, for tuning 759, 765, 771, 777, 783, 789, and 795 MHz, respectively.

Figure 5:
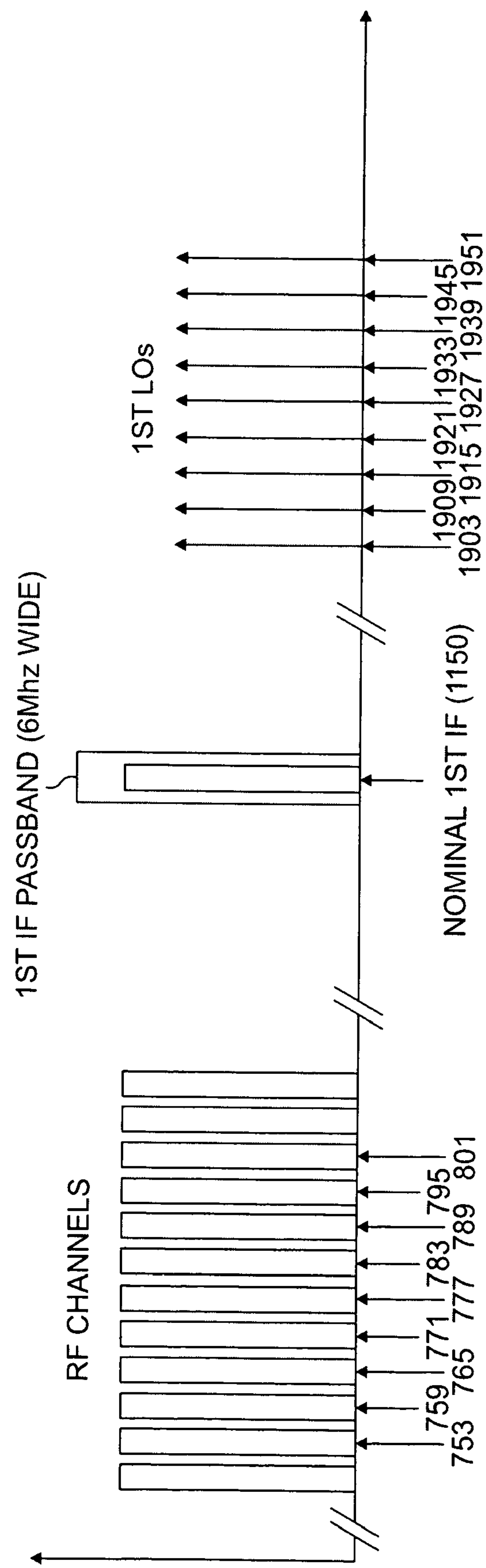
FIG. 5 shows a 1st IF passband using Equation 1 (below).

Third, the bandwidth of the $1^{st}$ IF bandpass filter needs to be wider than if only Equation 1 were used. If only Equation 1 were used for the $1^{st}$ LO, the $1^{st}$ IF passband only needs to be 6 MHz wide, as shown in FIG. 5. In this figure, the $1^{st}$ IF passband can encompass all the frequencies needed for $1^{st}$ IFs, which in this case is only one frequency. The $1^{st}$ LO's, on the right hand side, represent the frequencies necessary to mix the RF channels, on the left hand side, to the nominal $1^{st}$ IF shown in the center.

When the $1^{st}$ LO's are modified to use LO' and LO", the $1^{st}$ IF passband grows to support the additional $1^{st}$ IF's. This can be roughly calculated by the above Equation (4).

In this example, the interferer bandwidth=5,850 MHz−5,725 MHz=125 MHz. The order of the LO harmonic is the $3^{rd}$ harmonic, and thus the IF Bandwidth=125 MHz/3+6 MHz=48 MHz.

Figure 6:
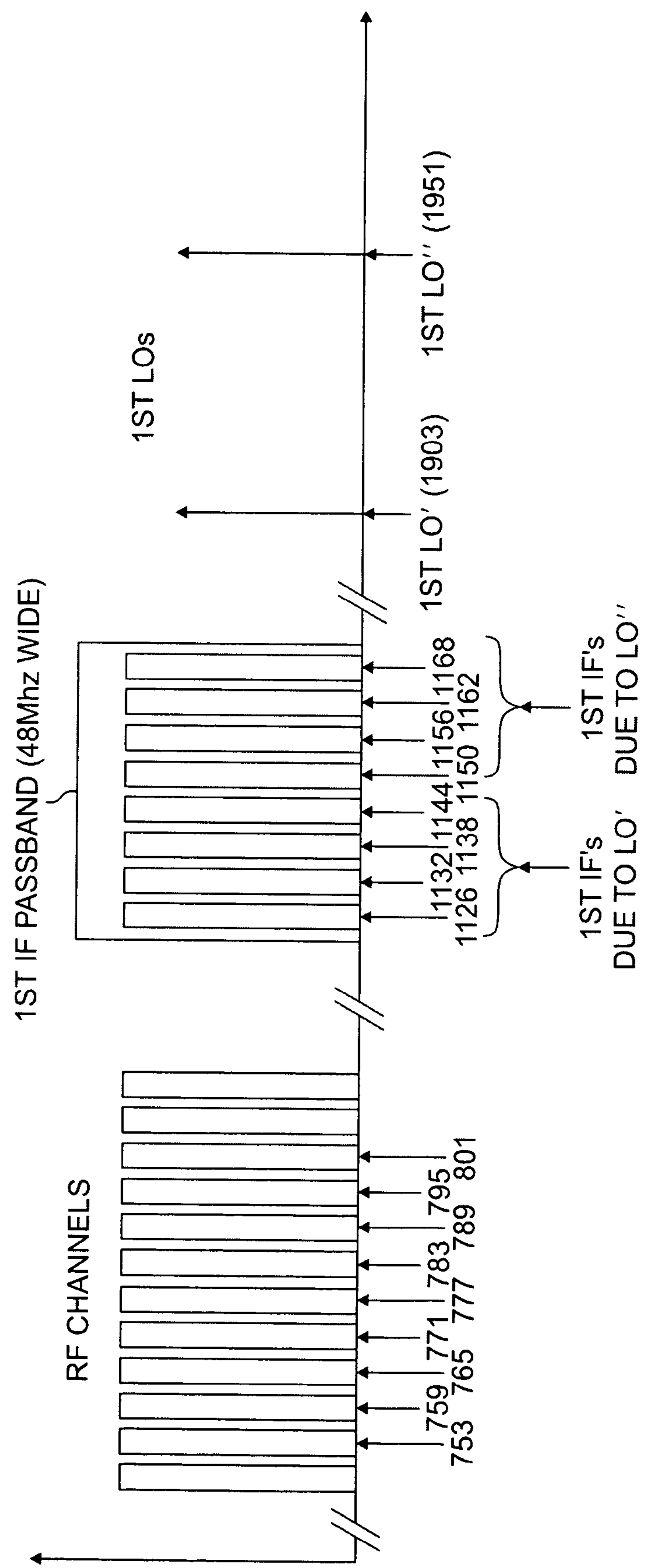
FIG. 6 shows a 1st IF Passband with a modified 1st LO' and 1st LO".

This is further validated by Table 1 which shows that there are eight different values of the $1^{st}$ IF frequency (8×6 MHz=48 MHz), as shown in FIG. 6. In this figure, the $1^{st}$ IF passband is much wider, and is in fact wide enough for eight different $1^{st}$ IF channels, corresponding to the $1^{st}$ IF frequencies shown in column (F) of Table 1. In this case, the $1^{st}$ LO' and $1^{st}$ LO", on the right hand side, represent the frequencies necessary to mix the RF channels, on the left hand side, to the multiple nominal $1^{st}$ IFs shown in the center, some of which are due to LO' and others of which are due to LO".

It should be noted that the description above refers to specific examples of the invention, but that the scope of the invention is to be limited only by the scope of the claims appended hereto. For example, while the term "double conversion tuner" has been used here, it should be understood that the system may be applied to a number of types of systems, including cable modems, embedded multimedia terminal adapters, residential gateways, and so on. While the broadband modem was disclosed to tune to its desired channel by programming a synthesizer to generate two separate LO signals—a $1^{st}$ LO and a $2^{nd}$ LO—different sources could also be employed. While the interfering frequencies $I_1, \ldots, I_N$ have been disclosed as individual frequencies, the same are actually frequency ranges. That is, $I_i$ generally represents a certain bandwidth of frequencies, but for convenience are shown here as singular frequencies.

The invention claimed is:

1. A double conversion tuner, comprising:

an input for a source of a plurality of RF channels, the plurality ranging from a lowest frequency channel signal to a highest frequency channel signal;

a synthesizer to generate a first and second local oscillator signal, the synthesizer capable of generating signals having frequencies within a first range;

a first mixer to mix a selected channel signal with the first local oscillator signal to generate a high intermediate frequency;

a first filter to filter the high intermediate frequency;

a second mixer to mix the high intermediate frequency with the second local oscillator signal to generate a low intermediate frequency;

a second filter to filter the low intermediate frequency; and a processor, responsive to sources of interference signals in a second frequency range, configured to adjust the frequency of the first local oscillator signal to avoid interference between the first local oscillator signal, or its harmonics, and the interference signals, wherein the sources of interference signals in the second frequency range span from a low-frequency interference signal to a high-frequency interference signal, and wherein the processor is configured to:

a. calculate values of potential first local oscillator signals that are at least one-half the frequency of any of the interference signals in the second frequency range;

b. determine if the values of potential first local oscillator signals are all within the first range;

c. if the values of potential first local oscillator signals are all within the first range, then:

i. choose a high intermediate frequency by dividing the high-frequency interference signal by two and subtracting the frequency of the lowest frequency channel signal, and choosing a value greater than or equal to the result;

ii. validate the selection of the high intermediate frequency for the second local oscillator;

iii. if the selection of the high intermediate frequency cannot be validated for the second local oscillator, adjust the value of the high intermediate frequency until the value of the high intermediate frequency is validated for the second local oscillator; and iv. calculate the range of first local oscillator frequencies based on the high intermediate frequency.

2. The tuner of claim 1, wherein the adjustment of the values of the interfering first local oscillators to remove the interference includes an adjustment upwards or downwards in frequency.

3. The tuner of claim 2, wherein if a first channel has a first local oscillator value that is non-interfering, and a second channel, adjacent to but higher in frequency than the first channel, has a first local oscillator value that is interfering, then the processor is configured to alter the value of the first local oscillator for the second channel to equal that of the first channel.

4. The tuner of claim 2, wherein if a first channel has a first local oscillator value that is non-interfering, and a second channel, adjacent to but lower in frequency than the first channel, has a first local oscillator value that is interfering, then the processor is configured to alter the value of the first local oscillator for the second channel to equal that of the first channel.

5. The tuner of claim 1, wherein the various channel signals, from the lowest frequency channel signal to the highest frequency channel signal, are separated by increments of substantially 6 MHz.

6. The tuner of claim 1, wherein the low intermediate frequency is from 43.75 MHz to 44 MHz.

7. The tuner of claim 1, further comprising a demodulator to process the signal output by the second filter.

8. The tuner of claim 1, wherein the high intermediate frequency is set high enough such that a second harmonic of a lowest first local oscillator frequency is above the second frequency range.

9. The tuner of claim 1, wherein the first filter has a width equal to the bandwidth of a selected interference signal divided by the order of the local oscillator harmonic that is interfering with the selected interference signal, added to the selected channel bandwidth.

10. A double conversion tuner, comprising:

an input for a source of a plurality of RF channels, the plurality ranging from a lowest frequency channel signal to a highest frequency channel signal;

a synthesizer to generate a first and second local oscillator signal, the synthesizer capable of generating signals haying frequencies within a first range;

a first mixer to mix a selected channel signal with the first local oscillator signal to generate a high intermediate frequency;

a first filter to filter the high intermediate frequency;

a second mixer to mix the high intermediate frequency with the second local oscillator signal to generate a low intermediate frequency;

a second filter to filter the low intermediate frequency; and a processor, responsive to sources of interference signals in a second frequency range, configured to adjust the frequency of the first local oscillator signal to avoid interference between the first local oscillator signal, or its harmonics, and the interference signals, wherein the sources of interference signals in the second frequency range span from a low-frequency interference signal to a high-frequency interference signal, and wherein the processor is configured to:

a. calculate values of potential first local oscillator signals that are at least one-half the frequency of any of the interference signals in the second frequency range;

b. determine if the values of potential first local oscillator signals are all within the first range;

c. if the values of potential first local oscillator signals are not all within the first range, then:

i. determine a highest-frequency interference signal that is within the first range;

ii. choose a high intermediate frequency by dividing the highest-frequency interference signal that is within the first range by two and subtracting the frequency of the lowest frequency channel signal, and choosing a value greater than or equal to the result;

iii. validate the selection of the high intermediate frequency for the second local oscillator;

iv. if the selection of the high intermediate frequency cannot be validated for the second local oscillator, adjust the value of the high intermediate frequency until the value of the high intermediate frequency is validated for the second local oscillator;

v. calculate the range of first local oscillators based on the high intermediate frequency;

vi. determine if any of the range of first local oscillators, or their harmonics, interferes with any of the sources of interference signals in the second frequency range, and if any do so interfere, adjust the values of the interfering first local oscillators to remove the interference.

11. A method for double conversion tuning, comprising:

providing an input for a source of a plurality of RF channels, the plurality ranging from a lowest frequency channel signal to a highest frequency channel signal;

generating a first and second local oscillator signal with a synthesizer, the synthesizer capable of generating signals having frequencies within a first range;

mixing a selected channel signal with the first local oscillator signal to generate a high intermediate frequency;

filtering the high intermediate frequency according to the selected channel signal;

mixing the first high intermediate frequency with the second local oscillator signal to generate a low intermediate frequency;

filtering the low intermediate frequency; and adjusting the frequency of the first local oscillator signal to avoid interference between the first local oscillator signal, or its harmonics, and a set of interference signals in a second frequency range, wherein the sources of interference signals in the second frequency range span from a low-frequency interference signal to a high-frequency interference signal, and further comprising:

a. calculating values of potential first local oscillator signals that are at least one-half the frequency of any of the interference signals in the second frequency range;

b. determining if the values of potential first local oscillator signals are all within the first range;

c. if the values of potential first local oscillator signals are all within the first range, then:

i. choosing a high intermediate frequency by dividing the high-frequency interference signal by two and subtracting the frequency of the lowest frequency channel signal, and choosing a value greater than or equal to the result;

ii. validating the selection of the high intermediate frequency for the second local oscillator;

iii. if the selection of the high intermediate frequency cannot be validated for the second local oscillator, adjusting the value of the high intermediate frequency until the value of the high intermediate frequency is validated for the second local oscillator; and iv. calculating the range of first local oscillator frequencies based on the high intermediate frequency.

12. The method of claim 11, wherein the adjusting the values of the interfering first local oscillators to remove the interference includes adjusting upwards or downwards in frequency.

13. The method of claim 12, wherein if a first channel has a first local oscillator value that is non-interfering, and a second channel, adjacent to but higher in frequency than the first channel, has a first local oscillator value that is interfering, then further comprising altering the value of the first local oscillator for the second channel to equal that of the first channel.

14. The method of claim 12, wherein if a first channel has a first local oscillator value that is non-interfering, and a second channel, adjacent to but lower in frequency than the first channel, has a first local oscillator value that is interfering, then further comprising altering the value of the first local oscillator for the second channel to equal that of the first channel.

15. The method of claim 11, wherein the various channel signals, from the lowest frequency channel signal to the highest frequency channel signal, are separated by increments of substantially 6 MHz.

16. The method of claim 11, wherein the low intermediate frequency is from 43.75 MHz to 44 MHz.

17. The method of claim 11, further comprising processing the signal output by the second filter with a demodulator.

18. The method of claim 11, further comprising setting the high intermediate frequency high enough such that a second harmonic of a lowest first local oscillator frequency is above the second frequency range.

19. The method of claim 11, wherein the first filter has a width equal to the bandwidth of a selected interference signal divided by the order of the local oscillator harmonic that is interfering with the selected interference signal, added to the selected channel bandwidth.

20. A method for double conversion tuning, comprising:

providing an input for a source of a plurality of RF channels, the plurality ranging from a lowest frequency channel signal to a highest frequency channel signal;

generating a first and second local oscillator signal with a synthesizer, the synthesizer capable of generating signals having frequencies within a first range;

mixing a selected channel signal with the first local oscillator signal to generate a high intermediate frequency;

filtering the high intermediate frequency according to the selected channel signal;

mixing the first high intermediate frequency with the second local oscillator signal to generate a low intermediate frequency;

filtering the low intermediate frequency; and adjusting the frequency of the first local oscillator signal to avoid interference between the first local oscillator signal, or its harmonics, and a set of interference signals in a second frequency range, wherein the sources of interference signals in the second frequency range span from a low-frequency interference signal to a high-frequency interference signal, wherein the sources of interference signals in the second frequency range span from a low-frequency interference signal to a high-frequency interference signal, and further comprising:

a. calculating values of potential first local oscillator signals that are at least one-half the frequency of any of the interference signals in the second frequency range;

b. determining if the values of potential first local oscillator signals are all within the first range;

c. if the values of potential first local oscillator signals are not all within the first range, then:

i. determining a highest-frequency interference signal that is within the first range;

ii. choosing a high intermediate frequency by dividing the highest-frequency interference signal that is within the first range by two and subtracting the frequency of the lowest frequency channel signal, and choosing a value greater than or equal to the result;

iii. validating the selection of the high intermediate frequency for the second local oscillator;

iv. if the selection of the high intermediate frequency cannot be validated for the second local oscillator, adjusting the value of the high intermediate frequency until the value of the high intermediate frequency is validated for the second local oscillator v. calculating the range of first local oscillators based on the high intermediate frequency;

vi. determining if any of the range of first local oscillators, or their harmonics, interferes with any of the sources of interference signals in the second frequency range, and if any do so interfere, adjust the values of the interfering first local oscillators to remove the interference.

* * * * *